United States Patent
Islam et al.

(10) Patent No.: US 11,080,483 B1
(45) Date of Patent: Aug. 3, 2021

(54) DEEP MACHINE LEARNING GENERATION OF DOMAIN NAMES LEVERAGING TOKEN METADATA

(71) Applicant: VERISIGN, INC., Reston, VA (US)

(72) Inventors: Mohammad Raihanul Islam, Fairfax, VA (US); Yaser Keneshloo, Arlington, VA (US); Yannis Labrou, Washington, DC (US); Andrew West, Reston, VA (US)

(73) Assignee: VERISIGN, INC., Reston, VA (US)

( * ) Notice: Subject to any disclaimer, the term of this patent is extended or adjusted under 35 U.S.C. 154(b) by 102 days.

(21) Appl. No.: 15/907,710

(22) Filed: Feb. 28, 2018

(51) Int. Cl.
| | |
|---|---|
| *G06F 40/284* | (2020.01) |
| *G06N 3/08* | (2006.01) |
| *G06F 16/951* | (2019.01) |
| *G06F 40/205* | (2020.01) |
| *G06F 40/253* | (2020.01) |
| *G06F 40/295* | (2020.01) |

(52) U.S. Cl.
CPC ........ *G06F 40/284* (2020.01); *G06F 16/951* (2019.01); *G06F 40/205* (2020.01); *G06F 40/253* (2020.01); *G06F 40/295* (2020.01); *G06N 3/08* (2013.01)

(58) Field of Classification Search
USPC .......................................................... 704/9
See application file for complete search history.

(56) References Cited

U.S. PATENT DOCUMENTS

| | | | | |
|---|---|---|---|---|
| 7,672,833 | B2 * | 3/2010 | Blume | G06F 17/278 704/10 |
| 8,010,539 | B2 * | 8/2011 | Blair-Goldensohn | G06F 16/345 707/750 |
| 8,700,404 | B1 * | 4/2014 | Chotimongkol | G10L 15/1815 704/257 |
| 2003/0144832 | A1 * | 7/2003 | Harris | G06F 17/2872 704/10 |
| 2008/0059187 | A1 * | 3/2008 | Roitblat | G06F 16/3344 704/257 |
| 2008/0126097 | A1 * | 5/2008 | Sarid | H04L 29/12594 704/270.1 |
| 2008/0154603 | A1 * | 6/2008 | Oddo | H04L 29/12594 704/251 |

(Continued)

*Primary Examiner* — Jakieda R Jackson
(74) *Attorney, Agent, or Firm* — MH2 Technology Law Group, LLP (57) ABSTRACT

Techniques for generating unregistered internet domain names using machine learning are presented. The techniques include parsing terms in an embedding training corpus of computer-readable text produce a tokenized embedding training corpus of text; adding tag(s) to produce a tagged tokenized embedding training corpus of text; vectorizing to produce a vector space embedding model mapping tagged tokenized terms to vectors; parsing domain names of a domain name training corpus of registered domain names to obtain a tokenized domain name training corpus; adding at least one tag to tokens to obtain a tagged tokenized domain name training corpus; vectorizing using the vector space model to produce a vectorized domain name training corpus; training a machine learning algorithm with the vectorized domain name training corpus to produce a trained machine learning model; generating an output domain name by the trained machine learning model; and outputting the output domain name.

20 Claims, 5 Drawing Sheets

(56) References Cited

U.S. PATENT DOCUMENTS

| | | | |
|---|---|---|---|
| 2008/0270120 A1* | 10/2008 | Pestian | G06F 17/2785 704/9 |
| 2009/0125308 A1* | 5/2009 | Ambler | G10L 15/26 704/254 |
| 2009/0204605 A1* | 8/2009 | Bai | G06F 16/3329 |
| 2009/0216524 A1* | 8/2009 | Skubacz | G06F 17/2785 704/9 |
| 2011/0270604 A1* | 11/2011 | Qi | G06F 17/271 704/9 |
| 2012/0278064 A1* | 11/2012 | Leary | G06F 17/274 704/9 |
| 2013/0117013 A1* | 5/2013 | Mugali, Jr. | G06F 17/28 704/9 |
| 2013/0173701 A1* | 7/2013 | Goyal | H04L 61/302 709/204 |
| 2014/0100845 A1* | 4/2014 | Hoskinson | H04L 61/3035 704/8 |
| 2014/0278365 A1* | 9/2014 | Zhang | G06F 17/2785 704/9 |
| 2014/0278405 A1* | 9/2014 | Peters | G06F 16/345 704/235 |
| 2015/0032443 A1* | 1/2015 | Karov | G06F 17/2785 704/9 |
| 2015/0134340 A1* | 5/2015 | Blaisch | G06F 16/95 704/275 |
| 2015/0142423 A1* | 5/2015 | Bekkerman | G06F 17/2745 704/9 |
| 2015/0262572 A1* | 9/2015 | Kelly | G06F 17/2785 704/9 |
| 2016/0012020 A1* | 1/2016 | George | G06F 17/2785 704/9 |
| 2016/0014151 A1* | 1/2016 | Prakash | H04L 63/1483 726/22 |
| 2016/0055490 A1* | 2/2016 | Keren | G06F 16/951 705/14.47 |
| 2016/0217522 A1* | 7/2016 | Jnagal | G06F 16/95 |
| 2016/0352772 A1* | 12/2016 | O'Connor | H04L 63/1483 |
| 2018/0063162 A1* | 3/2018 | Baughman | H04L 63/1416 |
| 2018/0211320 A1* | 7/2018 | Kamdar | G06F 16/3322 |
| 2019/0236469 A1* | 8/2019 | Canim | G06N 5/045 |
| 2019/0361870 A1* | 11/2019 | Lai | G06F 16/90335 |
| 2020/0067861 A1* | 2/2020 | Leddy | H04L 51/12 |
| 2020/0252372 A1* | 8/2020 | Bilsten | G06F 3/0481 |

\* cited by examiner

DEEP MACHINE LEARNING GENERATION OF DOMAIN NAMES LEVERAGING TOKEN METADATA

FIELD

This disclosure relates generally to internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

A DNS "registry" is an authoritative, master database of all domain names registered in a top-level domain or other domain in which domain names can be registered. A registry includes many hardware computer servers operably coupled to the internet. Internet users generally interact with the registry via intermediaries. For ease of discussion, a registry is identified with its hardware computer servers unless otherwise specified or clear from context.

SUMMARY

According to various embodiments, a computer-implemented method of generating internet domain names using machine learning is disclosed. The method includes accessing, using an electronic processor, an embedding training corpus of computer-readable text; parsing terms in the embedding training corpus of text, using an electronic processor, to produce a tokenized embedding training corpus of text; adding at least one tag to parsed terms in the tokenized embedding training corpus of text, using an electronic processor, to produce a tagged tokenized embedding training corpus of text; vectorizing, using an electronic processor, the tagged tokenized training corpus of text to produce a vector space embedding model mapping tagged tokenized terms to vectors; identifying, using an electronic processor, a domain name training corpus of registered domain names; parsing, using an electronic processor, domain names of the domain name training corpus of registered domain names to obtain a tokenized domain name training corpus; adding at least one tag to tokens in the tokenized domain name training corpus of domain names, using an electronic processor, to obtain a tagged tokenized domain name training corpus; vectorizing tagged tokenized terms of the tagged tokenized domain name training corpus using the vector space model and an electronic processor to produce a vectorized domain name training corpus; training, using an electronic processor, a machine learning algorithm with the vectorized domain name training corpus to produce a trained machine learning model; generating, using an electronic processor, at least one output domain name by the trained machine learning model; and outputting the at least one output domain name.

Various optional features of the above embodiments include the following. The outputting may include causing the at least one output domain name to be displayed. The method may include presenting the at least one output domain name to a potential registrant; and registering the at least one output domain name to the potential registrant. The generating may include reverse mapping based on a maximum vector component using the vector space embedding model. The generating may include reverse mapping based on a beam search using the vector space embedding model. The at least one tag may include named entity recognition information. The at least one tag may include parts-of-speech information. The at least one tag may include sentiment information. The at least one tag may include search engine score information. The method may further include selecting, prior to the generating, a set of parameters for the trained machine learning model; evaluating, prior to the outputting, the trained machine learning model using the at least one output domain name; and repeating the selecting, the generating, and the evaluating at least once prior to the outputting.

According to various embodiments, a computer system for generating internet domain names using machine learning is disclosed. The computer system includes at least one electronic processor programmed to perform: accessing an embedding training corpus of computer-readable text; parsing terms in the embedding training corpus of text to produce a tokenized embedding training corpus of text; adding at least one tag to parsed terms in the tokenized embedding training corpus of text to produce a tagged tokenized embedding training corpus of text; vectorizing the tagged tokenized training corpus of text to produce a vector space embedding model mapping tagged tokenized terms to vectors; identifying a domain name training corpus of registered domain names; parsing domain names of the domain name training corpus of registered domain names to obtain a tokenized domain name training corpus; adding at least one tag to tokens in the tokenized domain name training corpus of domain names to obtain a tagged tokenized domain name training corpus; vectorizing tagged tokenized terms of the tagged tokenized domain name training corpus using the vector space model to produce a vectorized domain name training corpus; training a machine learning algorithm with the vectorized domain name training corpus to produce a trained machine learning model; generating at least one output domain name by the trained machine learning model; and outputting the at least one output domain name.

Various optional features of the above embodiments include the following. The at least one electronic processor may be further programmed to perform: presenting the at least one output domain name to a potential registrant; and registering the at least one output domain name to the potential registrant. The generating may include reverse mapping based on a maximum vector component using the vector space embedding model. The generating may include reverse mapping based on a beam search using the vector space embedding model. The at least one tag may include named entity recognition information. The at least one tag may include parts-of-speech information. The at least one tag may include sentiment information. The at least one tag may include search engine score information. The at least one electronic processor may be further programmed to perform: selecting, prior to the generating, a set of parameters for the trained machine learning model; evaluating, prior to the outputting, the trained machine learning model using the at least one output domain name; and repeating the selecting, the generating, and the evaluating at least once prior to the outputting.

According to various embodiments, computer readable media comprising computer readable instructions, which, when executed by a computer system comprising at least one electronic processor, cause the computer system to generate internet domain names using machine learning is disclosed. The computer readable comprise instructions, which, when executed by a computer system comprising at least one electronic processor, cause the computer system to perform: accessing an embedding training corpus of computer-readable text; parsing terms in the embedding training corpus of text to produce a tokenized embedding training corpus of text; adding at least one tag to parsed terms in the tokenized embedding training corpus of text to produce a tagged tokenized embedding training corpus of text; vectorizing the tagged tokenized training corpus of text to produce a vector space embedding model mapping tagged tokenized terms to vectors; identifying a domain name training corpus of registered domain names; parsing domain names of the domain name training corpus of registered domain names to obtain a tokenized domain name training corpus; adding at least one tag to tokens in the tokenized domain name training corpus of domain names to obtain a tagged tokenized domain name training corpus; vectorizing tagged tokenized terms of the tagged tokenized domain name training corpus using the vector space model to produce a vectorized domain name training corpus; training a machine learning algorithm with the vectorized domain name training corpus to produce a trained machine learning model; generating at least one output domain name by the trained machine learning model; and outputting the at least one output domain name.

Some embodiments provide a technological improvement over existing domain name generation techniques because they intelligently generate domain names that are similar to registered domain names. More particularly, embodiments may generate domain names for an emergent name space with language characteristics that resemble those of domain names from an existing, mature name space. This is a technological improvement because it reduces or eliminates the number of unsatisfactory domain names that are generated, which saves processing time, storage space, display space, transmission bandwidth, user time to sort through them and decide which to register, etc.

Moreover, some embodiments have the ability to capture deep contextual relationships of domain name language at the term level. This permits for fine-grained contextual considerations, which are lacking from current techniques. Further, embodiments are superior to domain name generation techniques that rely on a pre-defined language of words with a fixed vocabulary. Instead, some embodiments utilize token-level generation backed by metadata tags using a trained language model based on deep-learning. A prior art technique, even if it considered an already registered domain name that includes the phrase "buffalowings", might produce a similar domain name that includes the phrase "flamingobeaks". In contrast, some embodiments use a language model that considers context at the term level, e.g., the context of both "buffalo" and "wings". Such embodiments would omit wrong-context domain names like "flamingowings" and thus represent a technical improvement over the prior art.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

At a base level, the desire to generate quality domain names that are valuable or otherwise "good quality" in a specific aspect should be readily apparent. Names may be considered "good quality" if a person is willing to pay money to register or transfer them, for example. These names can be used as the basis for a name portfolio acquisition strategy, or for any of a variety of other purposes. Some embodiments provide for the generation of domain names with enhanced quality.

Deep learning models have the capacity to learn language properties, provided they are given: (1) sufficient context, and (2) a sufficient quantity of training examples (often in the hundreds-of-thousands to millions). The language of domain names, however, is deficient under both properties. First, context is limited because most domain names are just two or three terms long, unlike the sentences or paragraphs of typical text. Second, for certain subsets (e.g., "German domain names related to plumbing"), the quantity of available training examples (names) might be limited. In such cases, some embodiments utilize metadata "hints" that disambiguate and hasten the machine learning process. For example, inclusion of named entity recognition ("NER") metadata expedites the model's convergence to the fact that "buffalowings_example.com" is dissimilar to "flamingowings_example.com", and enables the handling of the "buffalo" token as context dependent.

Therefore, some embodiments specially process the domain name training corpus before building a generative model using a machine learning technique. In particular, the techniques may tokenize (i.e., parse) the domain names in the domain name training corpus into their constituent terms and add a variety of tags to each such term. The tags may provide metadata that elaborate on the terms themselves. Thus, the tags may provide context to the individual terms. Further, the techniques may apply an embedding technique to the parsed and term-labeled domain names of the domain name training corpus so as to represent them as vectors in a vector space that has favorable properties, such as lower dimensionality.

The techniques then apply a machine learning technique, such as pattern recognition via neural networks, to the vector space representation. The applied machine learning technique produces a trained model. This model can then be used generatively to provide domain names. These domain names can be filtered to remove any already-registered domain names, and the results output to a user for inspection, possible registration, or other uses. Thus, some embodiments take as input previously registered domain names and produce as an output one or more domain names that are not currently registered.

Thus, in generating domain names, some embodiments utilize external information that could never be inferred from language properties. For example, "cryptocurrency" is an emergent technological area, and domain names containing related terms are likely to be interesting to the market. However, because it is not a mature technology, such domains may not be well represented in the existing domain name system. By tagging (or overwriting) existing cryptocurrency tokens with context-specific tags representing popularity, price, trend, or search-engine-optimization properties consistent with those of mature technologies, embodiments so-configured may output such tokens more frequently, better meeting user desires.

Some embodiments include techniques for identifying and presenting to a user domain names that he or she might be interested in registering. The suggested names may not be currently registered, and are determined in a manner such that they are likely to be of interest to the user. The techniques can accept as an input a domain name training corpus of registered domains in one or more top-level domains ("TLD") that have selected characteristics. The input names may be chosen to be of interest to the user based on some criteria.

Figure 1:
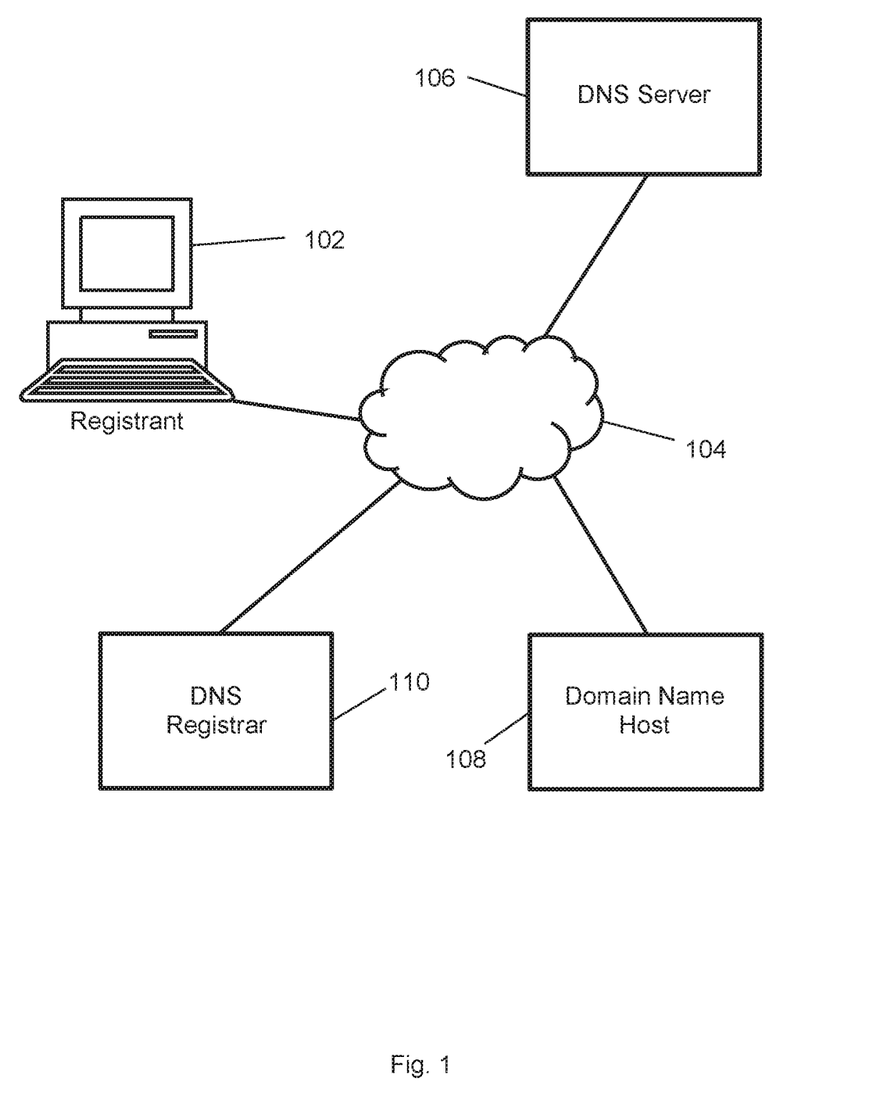
FIG. 1 is a schematic diagram illustrating a portion of the domain name system ("DNS") according to some embodiments.

FIG. 1 is a schematic diagram illustrating a portion of the domain name system ("DNS") according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with registrar 110 through the internet 104 to purchase, or "register", a domain name, thereby becoming registrant 102 for that name. Registrar 110 asks registrant 102 to provide various contact and technical information for the registration. Registrar 110 then keeps a record of the contact information and submits the technical information to the DNS registry (not shown).

When any internet user (not shown) attempts to navigate his or her browser to the registered domain through internet 104, the browser contacts DNS server 106, which provides an IP address for domain name host 108 of the registered domain by looking up an appropriate DNS resource record for the domain name. The internet user's browser then navigates to domain name host 108 using its IP address to retrieve the resource associated with the domain name, e.g., content.

For ease of discussion, a registrar is identified with its hardware computer servers unless otherwise specified or clear from context. Further, an internet user has a hardware client computer. For ease of discussion, an internet user (e.g., registrant 102) is identified with his or her hardware client computer unless otherwise specified or clear form context.

Figure 2:
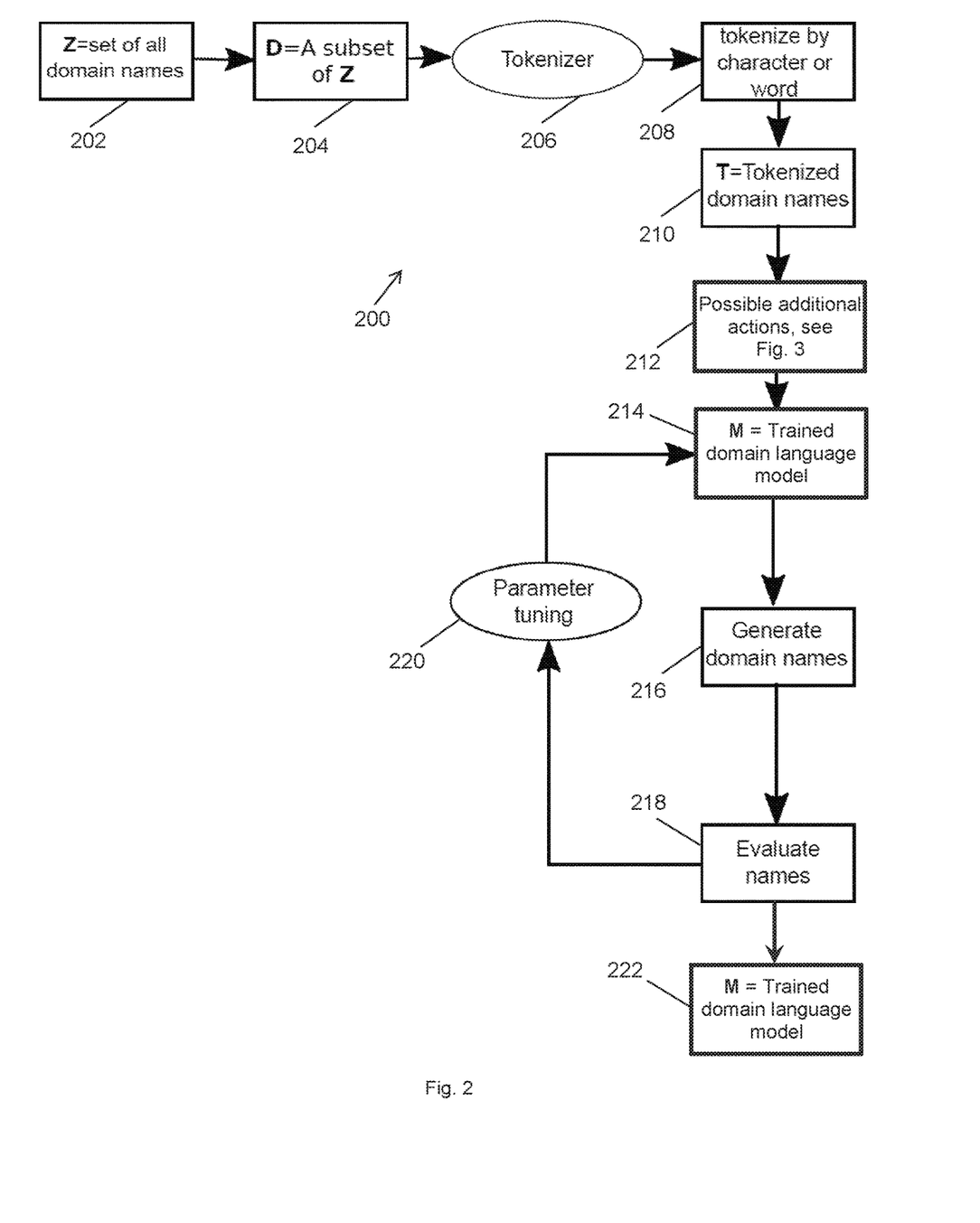
FIG. 2 is a hybrid diagram illustrating several basic domain name generation techniques.

FIG. 2 is a hybrid diagram illustrating several domain name generation techniques 200. Thus, FIG. 2 will be used to describe multiple domain name generation techniques 200, presented in order of increasing complexity, as follows: first, character-granularity machine learning domain name generation, second, word-granularity machine learning domain name generation, third, word-granularity machine learning domain name generation with pre-trained embedding, and fourth, word-granularity machine learning domain name generation with pre-trained embedding and metadata tagging. Techniques 200 may be used to obtain one or more unregistered domain names that are likely to be of interest to a user. Techniques 200 may be implemented on computer hardware as shown and described below in reference to FIG. 5, for example.

II. First Basic Technique: Character-Granularity Machine Learning Domain Name Generation The character-granularity machine learning domain name generation technique disclosed in this section considers each allowable character in a domain name as the vocabulary of the language. This includes the letters a-z, numerals 0-9, and the hyphen character "-", for a total of 37 characters.

At block 202, the first basic technique considers the set Z of all registered domain names. If used as an input set, "all registered dot COM domain names," for example, would output "names that are linguistically similar to registered dot COM names." Note that this block may be omitted, in the sense that embodiments may select a subset of all registered domain names for some top level domain at block 204 as an initial step.

At block 204, the first basic technique filters (or selects) a subset of registered domain names D as a domain name training corpus. Note that the subset D is useful for obtaining more focused domain names from techniques 200. In general, suitable subset selection characteristics of block 204 are many and varied. The selection process can be performed according to a predefined criterion or randomly. Ten example filter characteristic categories, which may be used to obtain the subset, are described presently. A first filtering characteristic category is registration history. The set of domain names may be filtered to retain or remove domain names that have a particular registration history. Types of registration history characteristics include, by way of non-limiting example, whether, and the type of any constraints on renewals or transfers, registrar identity, pricing data, such as pricing tier from among a defined plurality of pricing tiers, registration date, and registration time. Any, or a combination, of these characteristics may be applied, possibly in combination with any, or a combination, of characteristics selected from one or more other characteristic categories. A second filtering characteristic category is linguistic characteristics. The set of domain names may be filtered to retain or remove domain names that have a particular linguistic characteristic. Types of linguistic characteristics include, by way of non-limiting example, limits to constraints on lengths, character patterns, inclusion or exclusion of certain characters, ease of tokenization, natural language of origin, and ease of pronounceability. Any, or a combination, of these characteristics may be applied, possibly in combination with any, or a combination, of characteristics selected from one or more other characteristic categories. A third filtering characteristic category is web traffic characteristics. The set of domain names may be filtered to retain or remove domain names that have a particular web traffic characteristic. Types of web traffic characteristics include, by way of non-limiting example, constraints on DNS requests, DNS requests by type, actual traffic received, geographical source of such traffic, and whether and to what extent the traffic is from humans or machines. Any, or a combination, of these characteristics may be applied, possibly in combination with any, or a combination, of characteristics selected from one or more other characteristic categories. A fourth filtering characteristic category is WHOIS characteristics. The set of domain names may be filtered to retain or remove domain names that have a particular WHOIS characteristic. Types of WHOIS characteristics include, by way of non-limiting example, geographical properties (e.g., country, state, or city of origin), physical contact addresses (e.g., country, state, or city of origin), email addresses, and privatization status. Any, or a combination, of these characteristics may be applied, possibly in combination with any, or a combination, of characteristics selected from one or more other characteristic categories. A fifth filtering characteristic category is current or topical marker characteristics. The set of domain names may be filtered to retain or remove domain names that have a particular current or topical marker characteristic. Types of current or topical marker characteristics include, by way of non-limiting example, subject matter of domain name or pages within (e.g., organized by the Dewey decimal system), participation in domain name parking or pay-per-click programs, and whether content exists on a web page for the domain name. Any, or a combination, of these characteristics may be applied, possibly in combination with any, or a combination, of characteristics selected from one or more other characteristic categories. A sixth filtering characteristic category is geographical marker characteristics. The set of domain names may be filtered to retain or remove domain names that have a particular geographical marker characteristic. Types of geographical marker characteristics include, by way of non-limiting example, natural language of hosted content, WHOIS country of registration, generalizations drawn from choice of registrar or web-host, and IP geolocation outcomes. Any, or a combination, of these characteristics may be applied, possibly in combination with any, or a combination, of characteristics selected from one or more other characteristic categories. A seventh filtering characteristic category is routing characteristics. The set of domain names may be filtered to retain or remove domain names that have a particular routing characteristic. Types of routing characteristics include, by way of non-limiting example, whether the domain name redirects to another domain name, and the latency in reaching the domain name. Any, or a combination, of these characteristics may be applied, possibly in combination with any, or a combination, of characteristics selected from one or more other characteristic categories. An eighth filtering characteristic category is pricing characteristics. The set of domain names may be filtered to retain or remove domain names that have a particular pricing characteristic. Types of pricing characteristics include, by way of non-limiting example, number of sales in aftermarket marketplaces, sales prices in aftermarket marketplaces, valuation for aftermarket marketplaces, and estimated price for aftermarket marketplaces. Any, or a combination, of these characteristics may be applied, possibly in combination with any, or a combination, of characteristics selected from one or more other characteristic categories. A ninth filtering characteristic category is TLD characteristics. The set of domain names may be filtered to retain or remove domain names that have a particular TLD characteristic. Types of TLD characteristics include, by way of non-limiting example, TLD identity, classification of TLD as country code TLD ("ccTLD"), generic TLD ("gTLD"), or other TLD, TLD base size, age of TLD in marketplace, and TLD pricing information. Any, or a combination, of these characteristics may be applied, possibly in combination with any, or a combination, of characteristics selected from one or more other characteristic categories. A tenth filtering characteristic category is security characteristics. The set of domain names may be filtered to retain or remove domain names that have a particular security characteristic. Types of security characteristics include, by way of non-limiting example, appearance on one or more blacklists, and appearance on one or more safe browsing lists. Any, or a combination, of these characteristics may be applied, possibly in combination with any, or a combination, of characteristics selected from one or more other characteristic categories. Note that the filtering characteristics that may be applied are not limited to those explicitly listed herein. Other characteristics may be used in addition or in the alternative.

At block 208 of the first basic technique, tokenizer 206 tokenizes the domain names in subset D to produce tokenized domain names T 210. "Tokenization" as used herein is the process of parsing domain names into their constituent parts at the specified level of granularity. That is, tokenization may be considered as the annotation or identification of sub-section boundaries inside a domain name string. According to the first basic technique, which operates on the character level, each character may be considered a separate token according to character-granularity machine learning domain name generation.

The first, second, and third basic techniques omit some (or all) of the steps represented by block 212. Thus, for the first basic techniques, after the actions of block 208 to produce T 210, control passes to block 214.

At block 214, the first basic technique trains a machine learning language model using the domain name training corpus processed thus far (i.e., T 210). In general, preparing the domain name training corpus for neural network input at this block involves vectorizing the domain name strings. This may be achieved by representing individual characters as "one-hot" vectors of a length equal to the size of the character alphabet (inclusive of any special tokenization symbol). A domain name string may be tokenized as a sequence (or vector, or time-series) of such vectors, which may be represented as a 2-dimensional binary matrix.

Thus, at block 214, the first basic technique provides vectorized tokenized domain names T 210 as input to the machine learning technique to create a trained language model M. Suitable neural network machine learning algorithms include, by way of non-limiting example, feed-forward neural networks, recurrent neural networks, long-short term memory neural networks, and convolutional neural networks. These examples of neural network machine learning algorithms share similar multi-level configurations. In each case, the network is composed of an "input layer" of nodes equal to the size of the character alphabet, one or more "hidden layers" of nodes, and a final "output layer" of nodes equal in size to the input layer. The hidden layers are composed of weight matrices and bias vectors that are updated during the training process by observing the sequences of tokens. The hidden layers, by design, may not have the capacity to store or reproduce exactly what was presented in the input. Instead, they abstract and capture generalized properties of the input language at the character-sequence level. At an extremely high level, it is the responsibility of the hidden layers per the learning algorithm chosen, to be provided a character (on the input layer) and predict the next character in the sequence (on the output layer). This predictive capability is accumulated by observing the character sequences (and broader context) present in the domain name training corpus T 210. That is, it constructs a probabilistic model where, given a specific member of the vocabulary (in the input layer), it can predict the next member of the vocabulary (in the output layer). When processing elements, the internal structure of the network is updating to reinforce and/or forget its predictive pathways. Collectively, the network forms a learned language model M. Thus, after the training process of block 214, the model M may act generatively.

At block 216, the first basic technique uses the trained model M to generate domain names for purposes of evaluating the suitability of the model M. Once trained, given a single element from the vocabulary, the model can provide the next probable element from the vocabulary given the current state (i.e., context) of the neural network. Performed successively, starting with a randomly-selected initial character, the first basic techniques can generate a domain name. Repeating this process may generate multiple domain names.

At block 218, the first basic technique evaluates the generated domain names. The actions of this block may be performed repeatedly in concert with the actions of blocks 214, 216, and 220. For example, the domain name generation techniques may be repeatedly or iteratively evaluated and refined.

To perform one evaluation and refinement cycle per blocks 214, 216, 218, and 220, first, the language model M is used in a generative manner to produce a set of newly generated domain names. The generation may be performed by priming the language model M with a single-character, which may be randomly selected, e.g., consistent with the probability distribution observed in subset D, and requiring the language model M to predict the next character in the sequence. Used successively, this process constructs a domain name string, and used repeatedly in this manner, multiple domain name strings. Second, the set of newly generated domain names may be evaluated, e.g., using one of two disclosed techniques.

A first evaluation technique determines whether the language model M generates a certain of proportion (e.g., percentage, fraction, or the like) of names that have been registered before but that it did not observe during training. If so, then this is an indicator that the language is learn-able and confidence in the value of the generated names that are not currently registered is justified. To do this, the system determines whether a ratio of a number of registered domain names generated that possess at least one specified characteristic but that are not in the training subset of domain names to a number of domain names generated exceeds a threshold. If the ratio is high enough, e.g., at least 25%, then the system considers the language model M as a good model for generating names that resemble those in subset D. Thus, the threshold may be set to 25% in some embodiments. Other embodiments may use any other threshold between zero and one, such as a threshold chosen from the range of 15%-50%.

A second evaluation technique is to apply any valuation metric to the generated domain names. The results of such application may be compared to the results of a similar application to the domain names in subset D. Comparable or higher valuations lead to a conclusion of acceptability; otherwise, the evaluation cycle may continue.

If the evaluation of block 218 indicates that language model M is not yet sufficiently successful, then control reverts to block 220, in which parameters for the language model M are tuned. In general, neural network algorithms expose parameters, which can affect the efficacy of the learned model or the speed at which the model learns. Such tunable variables include, but are not limited to: number of hidden layers, number of nodes per layer, number of training epochs, optimization algorithm (e.g., gradient descent), activation function (e.g., tanh, softmax), or loss function (e.g., cross entropy). These parameters are set or adjusted per block 220, and then control passes back to the learning of block 214. An updated language model M is produced, and the evaluation process repeats as disclosed.

Once the language model M passes the evaluation of block 218, it is denoted as the final language model and stored in persistent memory per block 220 for later generative usage. Used generatively, the first basic techniques produce a set of domain names. This set may be filtered to remove any registered domain names, and those names may be used for a variety of purposes, such as presentation to a domain name investor for registration.

III. Second Basic Technique: Word-Granularity Machine Learning Domain Name Generation The second basic machine learning domain name generation technique is similar to the first basic machine learning domain name generation technique, except it operates at the word level instead of the character level. Such technique considers each meaningful word (or term) in a domain name as a vocabulary member, instead of considering each character.

Blocks 202 and 204 proceed as in the first basic techniques as described above.

At block 208, the second basic technique tokenizes 208 the domain names in subset D of domain names at the word level of granularity to produce tokenized domain names T 210. Tokenization for the second basic technique is a process of identifying individual terms (e.g., words from a specific language) within a domain name. Technical specifications prevent domain names from being space-delimited, and many domain names are a concatenation of multiple words or terms. For example, the string "thisisadomainname" might be tokenized as "this|is|a|domain|name" in the English language, where the special pipe character "|" denotes a boundary, and the pipe character is not in the character-space from which domain name strings are composed. Suitable tokenization algorithms may be based on probabilistic dictionary techniques. Different tokenization methods may produce different annotations. Explicitly annotating boundaries as described can help to expedite the learning of language models by suppressing the need for the learning process to derive such boundaries implicitly. A number of techniques may be utilized to produce a tokenization, including but not limited to: dictionary-based fitness methods, character sequence probabilities, etc.

Like the first basic technique, the second basic technique omits block 212. Also like the first basic technique, the second basic technique vectorizes the tokenized domain names for input to the machine learning training algorithm. The vectorization for the second basic techniques operates at the word level of granularity, utilizing vectors whose length corresponds to the size of the vocabulary itself. Such vectors may use one-hot encoding, where each vector has zeros in all but one component, which has a one, indicating that the vector encodes the word corresponding to the component at which the one appears. The dimensionality of the associated vector space is the same as the size of the vocabulary in such embodiments. Once so encoded, the domain name training corpus is provided to a machine learning training algorithm, as in the first basic technique.

Like the first basic technique, the second basic technique may be subjected to an evaluation and refinement cycle per blocks 214, 216, 218, and 220. The actions of such a cycle are essentially the same as in the first basic technique, except that the generating domain names of block 216 proceeds at the word level of granularity. For the second basic technique, all unique tokens identified in the domain name training corpus compose the (potentially very large) vocabulary for a model construction. During generation, provided a randomly-selected seed token, the model iteratively generates a contextually-aware sequence of tokens to form a complete domain name. Performed repeatedly, this technique generates multiple domain names, which may be screened to filter out those that are already registered, as in the first basic techniques.

IV. Third Basic Technique: Word-Granularity Machine Learning Domain Name Generation With Pre-Trained Embedding The third basic technique is described presently by way of comparison to the first two basic techniques and in reference to FIG. 2. One way that the third basic technique differs from the first and second basic techniques is in the way that it vectorizes the domain name training corpus. The first basic technique utilizes length 37 vectors with so-called "one-hot encoding". For example, "a" is represented as [1 0 0 0 0 0 0 0 0 0 0 0 0 0 0 0 0 0 0 0 0 0 0 0 0 0 0], and "b" as [0 1 0 0 . . . ] and so on. The second basic technique performs a similar mapping with word granularity tokens, potentially resulting in very lengthy vectors. For example, an input set of one million domain names might tokenize to 1.5 million unique tokens, resulting in a one-hot word vector of length 1.5 million. This can be problematic for algorithmic scalability, and is thus is not preferable for implementations that have a large number (e.g., more than 1,000 or more than 10,000) of unique tokens. The third basic technique encodes domain names differently from the first two basic techniques for purposes of performing machine learning for domain name generation purposes. For the third basic technique, the vocabulary is represented as a numeric vector in Euclidean space by way of a process referred to herein as "embedding". Embedding utilizes a vector-space model, where each token is represented as a fixed length vector. This embedding process produces a mapping from vocabulary terms to their representative vectors.

The third basic technique's usage of embedding allows it to separate learning token relationships from learning token contexts. To explain simply, what the first two basic techniques are doing when training is both: (1) learning the relationship of tokens and their interchangeability (which is part of embedding), and (2) learning the contextually appropriate sequences of those tokens. The first two basic techniques perform these tasks simultaneously when undergoing machine learning, whereas the third basic technique performs these tasks as separate machine learning applications.

Turning now to FIG. 2 to illustrate the third basic technique, such technique performs the actions of blocks 202 and 204 in essentially the same manner as the first and second basic techniques. The third basic technique also utilizes tokenizer 206 to tokenize 208 the domain names in subset D into their constituent terms, resulting in tokenized domain names T 210, as in the second basic technique.

At block 212, the third basic technique performs embedding by vectorizing the tokenized domain names T to vectors in a vector space model. In particular, the vector-space model is trained using a text corpus so the relationships and interchangeability of the tokenized domain names T can be properly learned. Such training produces an embedding map from the vocabulary elements to the vector space. In some embodiments, the domain name training corpus may be a DNS zone file. In other embodiments, third-party data sources may be utilized to more broadly capture text relationships. For example, text from an online encyclopedia (e.g., Wikipedia) may be utilized in this task, and other possible sources include semantic networks that are designed for the purpose of helping computers understand word meanings (e.g., ConceptNet) and libraries of digitized books (e.g., Project Guttenberg). Utilizing such broad "real-world language" embeddings can help alleviate some of the aforementioned issues about minimal context in the domain name language. Suitable existing techniques for embedding and producing such vector-space models include "word2vec", "skip-gram", and "chow", non-exhaustively. It is also possible for pre-trained embeddings provided by third parties, possibly based on proprietary data, to be used.

The embedding process tends to place vectors of similar words closer to each other in multi-dimensional Euclidean space. Such vector-space models may do this by optimizing an objective function where vectors of tokens are passed as parameters. Typically, such vector space models use low-rank matrix factorization, topic modeling, skip-gram models, etc. The dense and real-valued token mappings into a vector-space model tend to be far more efficient token descriptors than the one-hot encodings of the first and second basic techniques. The vector-space model representations of the tokens have significantly smaller representations, e.g., a few hundred to a few thousand dimensions. (Some embodiments utilize vector spaces with dimension 128 to 4096.) It is these vectors, rather than the tokenized domain names, that are provided as deep learning input. In sum, the third basic technique prepares an input to a domain name generation machine learning algorithm by vectorizing the tokenized domain name training corpus T 210 at block 212 using an embedding generated by a dedicated machine learning process.

At block 214, the third basic technique supplies the vectorized domain name training corpus as an input to a machine learning algorithm in order to capture the context of the tokenized vectorized domain names. Suitable algorithms are described above in reference to the first and second basic techniques above. Training is similar to the training of the first and second basic techniques, except it operates on the tokenized vectorized domain names T 210.

As previously suggested, the training corpus for the machine learning vectorization process, referred to herein as the "embedding training corpus", may differ from the domain name training corpus for the machine learning domain name generation process. That is, the third basic technique utilizes two instances of machine learning, and two corresponding training corpuses. These training corpuses may differ, e.g., the embedding training corpus may be from a general source, such as an online dictionary. The domain name training corpus for purposes of embedding may be a DNS zone file, or a portion thereof. Note that, because the training corpuses differ, there may be tokens in the domain name training corpus that do not appear in the embedding training corpus. In this case, the machine learning domain name training process according to some embodiments may map each of the words that are in the embedding training corpus but not in the domain name training corpus to a special placeholder term, denoted here as "<unk>" (short for "unknown") in the vector space vocabulary.

Like the first and second basic techniques, the third basic technique may be subjected to an evaluation and refinement cycle per blocks 214, 216, 218, and 220. The actions of such a cycle are essentially the same as in the first and second basic techniques, except for the generating domain names of block 216. Used generatively, a vectorized seed token of length n is provided at input, and the output is a length n vector representing the output token, which in turn is used as the input vector for the next iteration. That is, because the model M is trained on embedding vectors (essentially, a fixed length, ordered list of weight values in a n-dimensional vector space) rather than characters or words, the output of the model during generation (the next value) is itself a vector of numeric weights. These vectors can be reverse mapped to words in a variety of ways. A first example of reverse mapping is to determine a nearest neighbor vector that is in the range (i.e., output) of the embedding function. Most of the points in the vector space do not correspond to embedded tagged tokenized terms; using a nearest neighbor approach allows for identifying the nearest vocabulary term. Such a nearest neighbor technique may be used in concert with the next two example approaches. A second example of reverse mapping the output vectors to words is to select the maximum value (corresponding to the most probable word) from the output vector. A third example of reverse mapping is to use a beam search with a fixed beam width e.g., three, to concurrently explore multiple paths of mapping vectors to tokens. In this example, instead of selecting the maximum weight and mapping it into a token, the top K (e.g., three, in this example) weights are selected and mapped to tokens. Once a sequence of vectors is identified by the trained model, they may be reverse mapped to terms, which may be concatenated to produce a newly generated domain name. Performed repeatedly, this process generates a plurality of names, which may be evaluated according to the above-described evaluation cycle.

As in the first and second basic techniques, once the evaluation of block 218 indicates that the language model M is sufficiently successful, then that model is denoted as the final language model and stored in persistent memory for later generative usage.

V. Advanced Technique: Word-Granularity Machine Learning Domain Name Generation with Pre-Trained Embedding and Tagged Metadata Some embodiments employ an advanced technique as disclosed presently in reference to FIGS. 2 and 3. With respect to FIG. 2, like the first, second, and third basic techniques, the advanced technique includes accessing domain names at block 202, filtering them at block 204, and tokenizing 208 them using tokenizer 206 to obtain tokenized domain names T 210. At block 212, the advanced technique implements actions as described presently in reference to FIG. 3. In particular, blocks 210 and 214 of FIG. 2 correspond to the blocks with the same enumerations in FIG. 3.

Figure 3:
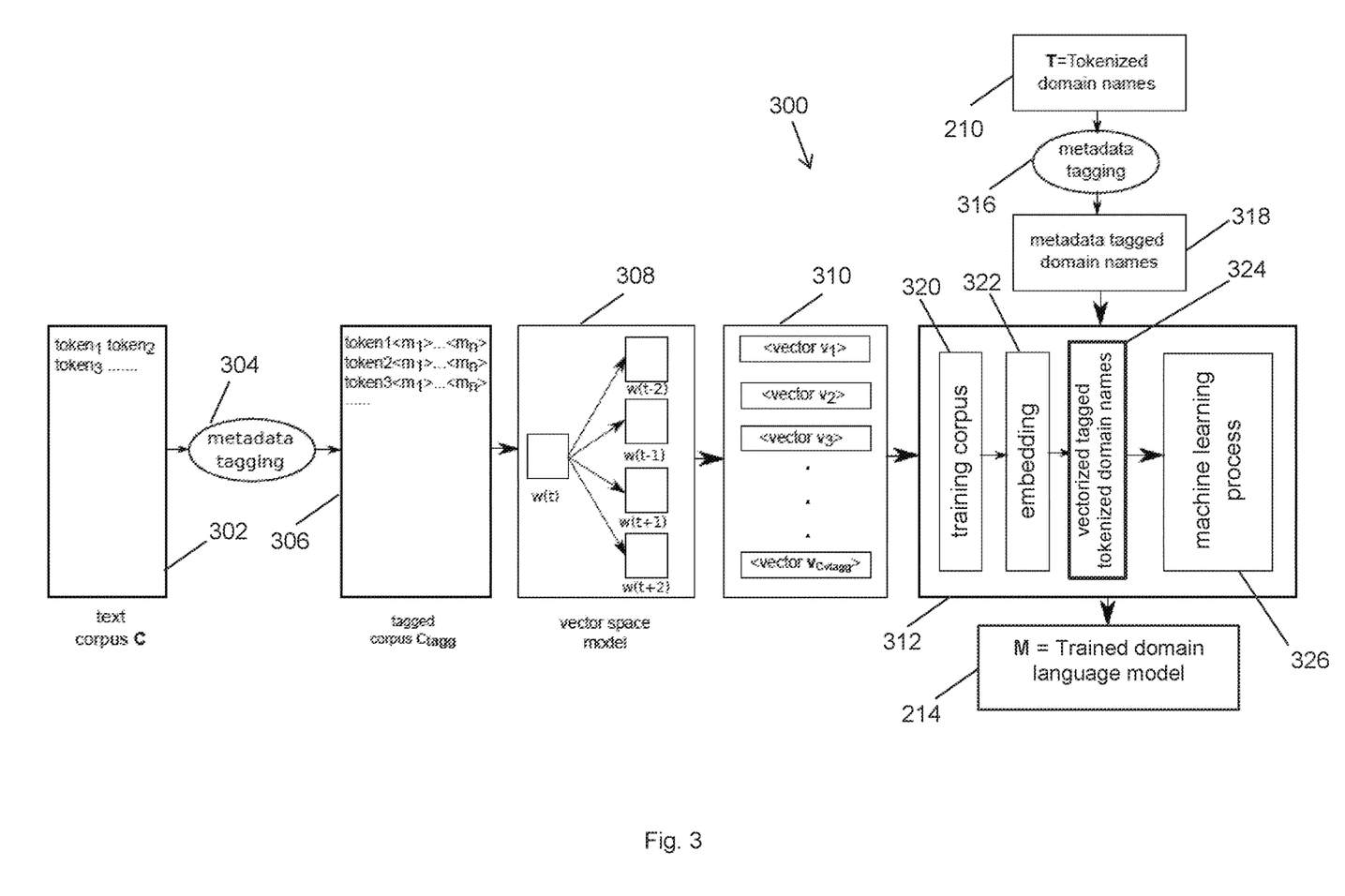
FIG. 3 is a hybrid diagram of an advanced domain name generation technique according to various embodiments.

FIG. 3 is a hybrid diagram of an advanced domain name generation technique according to various embodiments. After the tokenized domain names T 210 are produced, they undergo metadata tagging per block 316 to produce metadata tagged tokenized domain names 318. A description of an example of the mechanics of metadata tagging according to some embodiments is described presently, followed by a detailed description of some types of metadata and its tagging contemplated for use with embodiments.

A description of an example of the mechanics of metadata tagging according to some embodiments follows. Given a word W, which may be tokenized into "token1 token2 token3", for example, some embodiments extend that sequence to the form "$token_1 <m_{1,1}><m_{1,2}> \ldots <m_{1,a}>$ $token_2 <m_{2,1}><m_{2,2}> \ldots <m_{2,b}>$ $token_3 <m_{3,1}><m_{3,2}> \ldots$ $<m_{3,c}>$ $token_k <m_{k,1}><m_{k,2}> \ldots <m_{k,z}>$", where each $<m_{..}>$ value is from a finite set that describe a property of the corresponding token. It is these extended text sequences over which the embedding model is constructed. The metadata tagged tokenized domain names are then passed to block 312, where they are processed for use as a domain name training corpus for the machine learning domain name generation process.

Categories of metadata usable by embodiments are many and varied. Examples include parts-of-speech, named entity recognition, sentiment, valuation, and search engine score. Various embodiments may utilize any, or any combination, of such metadata categories, for any number of metadata tags. Detailed descriptions of parts-of-speech and named entity recognition metadata tagging follow. Other categories of metadata tagging may be implemented using analogous techniques.

Some embodiments utilize parts-of-speech metadata tagging. In particular, some embodiments identify and tag the parts-of-speech (POS) of each term in both the domain name training corpus and the embedding training corpus. Such embodiments may learn separate embeddings for each term and POS combination present in the embedding training corpus. Consider the following, for example:

Every run is important. I run every day.

This above sentences can be tagged by POS the following way:

Every<DT> run<NN> is<VBZ> important<JJ>. I<PRP> run<VBP> every<DT> day<NN>.

As presented above, "run" is used in two different contexts and thus has different POS tags associated with the different instances of its use. Note that the POS tag labels may be standardized labels used in this area of research (e.g., DT=determiner, NN=singular noun, VBZ=verb, third person singular present, JJ=adjective, PRP=personal pronoun, and VBP=verb, non-third-person). Therefore, the embedding map provides two embeddings for terms that include "run": one is for "run<VBP>" and one is for "run<NN>". In this way, such embodiments compute the embedding not only for the mere words, but also for each context in which they are used. Modeling with this information can help prevent awkward domain name constructions. Given the limited context of items in the domain name training corpus, it may be useful to use, e.g., content on the domain name itself to help assist in the POS tagging task.

Some embodiments utilize named entity recognition (NER) metadata tagging. Named entity recognition is an information extraction process which classifies named entities within a training corpus. The named entities can be classified into several classes, such as persons, organizations, locations etc. For example, consider the following sentence:

Acme unveiled the new rocket boots.

NER may process this sentence as follows.

(Acme)<COMPANY> (unveiled)<UNK> (the)<UNK> (new)<UNK> (rocket)<PRODUCT> (boots)<PRODUCT>

In the above, <UNK> generically represents a metadata tag for words that are not categorized by the technique. An embodiment may utilize this processing to tag words in the sentence with the shown NER metadata tags.

Some embodiments may utilize multiple different metadata tags. For example, tagging the same example sentences as above with both part-of-speech and NER metadata tags may result in an output of the following form.

(Acme)<POS><COMPANY> unveiled<POS><UNK> the<POS><UNK> new<POS><UNK> rocket<POS><PRODUCT> boots<POS><PRODUCT>

In the above, <POS> generically represents the part-of-speech tags produced by part-of-speech metadata tagging. Given the limited context of items in the domain name training corpus, it may be helpful to use, e.g., content from the domain itself to help assist in the NER tagging task, such as content from a website associated with a domain name.

It is feasible to associate many more (or alternative) metadata tags with tokens. Because the embedding process will efficiently represent them as fixed-length vectors in a multi-dimensional space, there is little concern for the sparsity that might be present with some metadata fields.

Thus, metadata-tagged tokenized domain names to be used as a domain name training corpus are provided to block 312 per the above-described process.

Also provided to block 312 is a machine learning vector space embedding as described above in Section IV. Such an embedding may be obtained starting with a corpus C of training text, which is tokenized at block 302. As described above in Section IV, the initial training text may be obtained from any of a variety of sources. The tokenized embedding training corpus undergoes metadata tagging 304 to generate a tagged tokenized embedding training corpus $C_{tagg}$ 306. The metadata tagging may be similar, or essentially identical, to that undergone by the tokenized domain names used for the domain name training corpus. The embedding starts with a vector space model 308, into which the elements form the tagged tokenized embedding training corpus 306 are embedded as vectors 310 using the techniques described above in Section IV.

At block 312, the tagged tokenized domain names 318 are used as a machine learning embedding training corpus 320 as described above in Section IV. Such training produces an embedding 322 from the space of tagged tokenized domain name terms, as represented by the embedding training corpus, to a high-dimensional vector space, as described in that section. Embedding 322 is applied to the tagged tokenized domain names 318 to map them to corresponding vectorized tagged tokenized domain names 324. Vectorized tagged tokenized domain names 324 are provided to train a machine learning process 326 as described above in Section IV. This process produces a trained machine learning language model M, which is provided to block 214 as the model of that block, thus concluding the actions shown and described in reference to FIG. 3.

Like the basic techniques, the advanced technique may be subjected to an evaluation and refinement cycle per blocks 214, 216, 218, and 220. The actions of such a cycle are essentially the same as in the third basic technique, where the domain name generating of block 216 may utilize a reverse mapping as described above in Section IV to obtain words from vectors, except that metadata tags may be stripped before concatenating terms.

Figure 4:
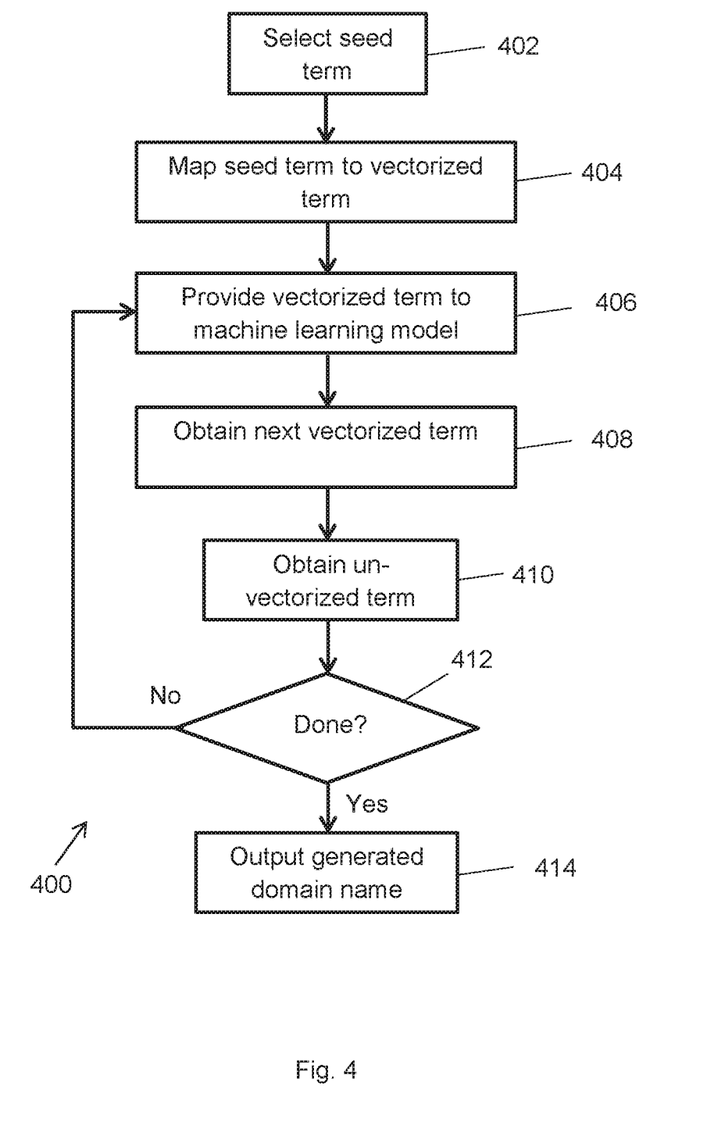
FIG. 4 is a flowchart of a method for generating domain names according to various embodiments.

FIG. 4 is a flowchart of a method 400 for generating domain names according to various embodiments. The generating may follow construction and positive evaluation of the language model described herein. The generation process is similar to or essentially the same as that of generating block 216 of FIG. 2 as described in this section, except that the parameters need not be tuned after the generated domain names are output.

At block 402, method 400 randomly selects a seed term. This process may select the term based on a uniform or other distribution, e.g., the probability distribution observed in subset D of FIG. 2. The seed term may be a word or word fragment. The seed term may be selected as a token from either the domain name training corpus or the embedding training corpus according to some embodiments. The actions of this block may include adding one or more metadata tags to the seed term to select desired contextual properties and to match the format of the data in the training corpuses.

At block 404, method 400 maps the seed term to a vector using an embedding as shown and described, e.g., embedding 322 of FIG. 3. The vector lies in a vector space associated with the embedding as disclosed herein.

At block 406, method 400 provides the term at issue (the seed term, or the most recently output term) to a trained machine learning model. The model M described above in this section is suitable.

At block 408, method 400 obtains the next vectorized term from the trained machine learning model to which the previous term was provided at block 406.

At block 410, method 400 obtains an un-vectorized term (e.g., a tagged tokenized term) corresponding to the vectorized term obtained at block 408. This may be obtained using either of the techniques for reverse mapping disclosed above in Section IV, e.g., using nearest neighbors, taking the tagged tokenized term that corresponds to the highest weight, using a beam search, or using a combination of the aforementioned techniques. Once reverse mapped, any metadata tags or other amendments may be stripped off at this block.

At block 412, method 400 checks whether the generation process is finished for generating a domain name, that is, whether the unvectorized terms obtained thus far, when concatenated, form a complete domain name. This may be accomplished, for example, by using a special delimiter character to signify the end of strings in the training corpuses, and then checking for its presence at the end of the term at issue at this block. If not done, then control reverts to block 406. If done, then control passes to block 414.

At block 414, method 400 outputs the generated domain name. The process may be repeated at this point to generate additional domain names. The generated domain names may be filtered to omit those that are already registered at this, or at another stage in the process. This may be accomplished by checking the registration status of the generated domain names with a DNS registrar or with the DNS registry itself. Some embodiments may be implemented by, or in concert with, a registrar or the registry. Such embodiments may communicate with a database that stores DNS registration records.

The generated domain names may be output in a variety of ways. According to some embodiments, the generated domain names are output by being displayed on a computer monitor. According to some embodiments, the generated domain names are output by being emailed to a selected email address. According to some embodiments, the generated domain names are output by presenting them to a user for registration. Such embodiments may be implemented by, or in coordination with a registrar or registry, which can implement the registration process. Such embodiments may present the user with a graphical user interface by which the user may select a particular domain name from the generated domain names and register it using the same interface. The registration may be accomplished using standard domain name registration techniques.

Figure 5:
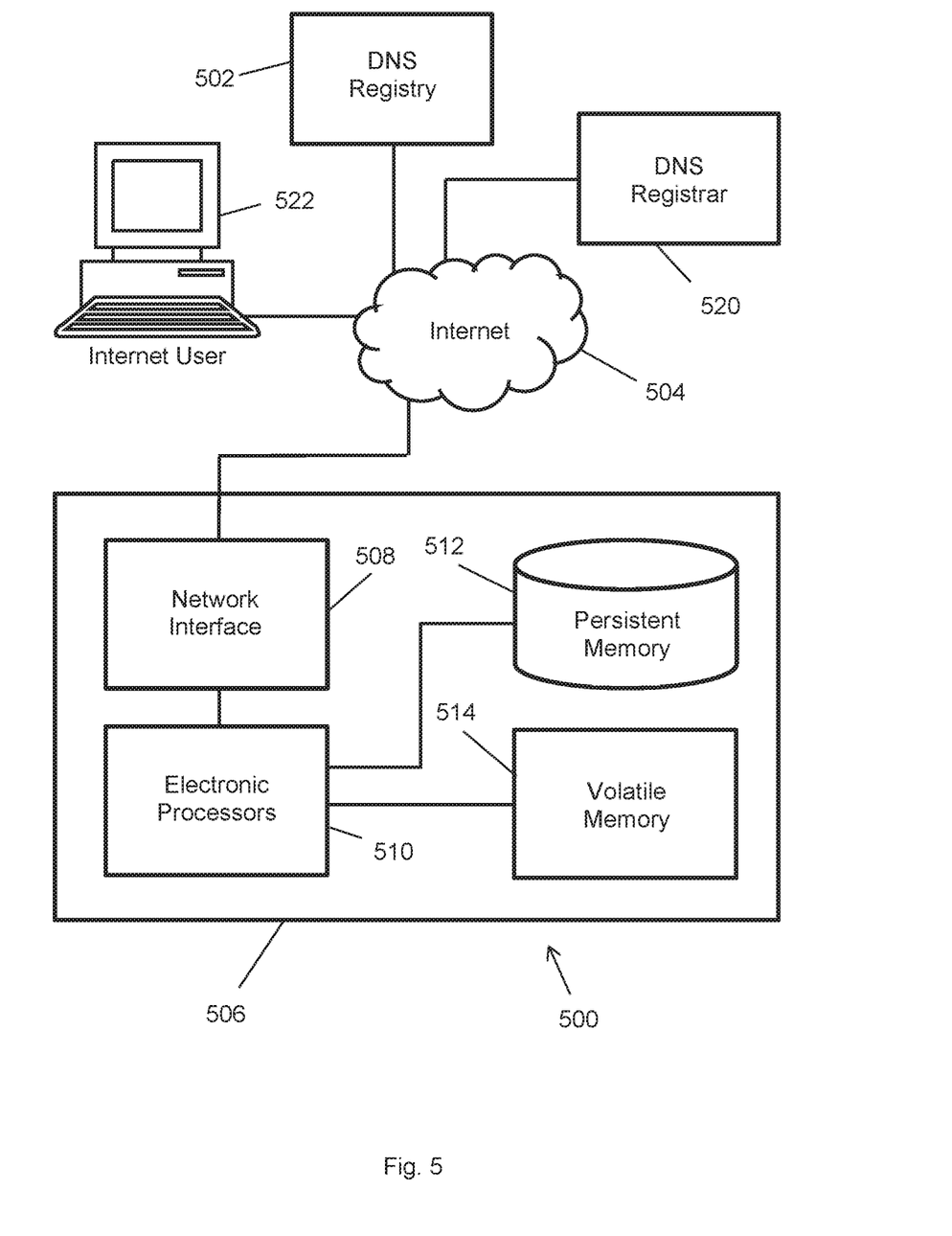
FIG. 5 is a schematic diagram of a system suitable for implementing methods according to some embodiments.

FIG. 5 is a schematic diagram of a system 500 suitable for implementing methods according to some embodiments. System 500 may be based around an electronic hardware internet server computer 506, which may be communicatively coupled to the internet 504. Server computer 506 includes network interface 508 to affect the communicative coupling to the internet 504. Network interface 508 may include a physical network interface, such as a network adapter. Server computer 506 may be a special-purpose computer, adapted for reliability and high-bandwidth communications. Thus, server computer 506 may be embodied in a cluster of individual hardware server computers, for example. Alternately, or in addition, server computer 506 may include redundant power supplies. Persistent memory 512 may be in a Redundant Array of Inexpensive Disk drives (RAID) configuration for added reliability, and volatile memory 514 may be or include Error-Correcting Code (ECC) memory hardware devices. Server computer 506 further includes one or more electronic processors 510, which may be multi-core processors suitable for handling large amounts of information. Electronic processors 510 are communicatively coupled to persistent memory 512, and may execute instructions stored thereon to effectuate the techniques disclosed herein, e.g., method 200 as shown and described in reference to FIG. 2 in any section above, or method 400 as shown and described in reference to FIG. 4, to generate domain names for internet user 522. Electronic processors 510 are also communicatively coupled to volatile memory 514.

Server computer 506 is communicatively coupled to DNS registry 502 and/or DNS registrar 520. (According to some embodiments, server computer 506 is provided by a registrar or registry for implementation of the disclosed methods.) The communication between server computer 506 and DNS registry 502 or DNS registrar 520 allows for determining whether generated domain names are currently registered, and also permits users to register unregistered domain names as disclosed herein.

Note that the domain name generation according to embodiments is distinct and different from the traditional "suggestion" task whereby a user is presented with similar available names if the user's initial search term is not available. Instead, some embodiments learn the shared properties of thousands (or millions, tens of millions, or even hundreds of millions) of names and find other names in that class regardless of their topic space.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of generating internet domain names using machine learning, the method comprising:
   accessing, using an electronic processor, an embedding training corpus of computer-readable text;
   parsing terms in the embedding training corpus of text, using an electronic processor, to produce a tokenized embedding training corpus of text;
   adding at least one tag to parsed terms in the tokenized embedding training corpus of text, using an electronic processor, to produce a tagged tokenized embedding training corpus of text;
   vectorizing, using an electronic processor, the tagged tokenized embedding training corpus of text to produce a vector space embedding model, which maps tagged tokenized terms to vectors;
   identifying, using an electronic processor, a domain name training corpus of registered internet domain names;
   parsing, using an electronic processor, internet domain names of the domain name training corpus of registered internet domain names to obtain a tokenized domain name training corpus;
   adding at least one tag to tokens in the tokenized domain name training corpus, using an electronic processor, to obtain a tagged tokenized domain name training corpus;
   vectorizing tagged tokenized terms of the tagged tokenized domain name training corpus using the vector space embedding model and an electronic processor to produce a vectorized domain name training corpus;
   training, using an electronic processor, a machine learning algorithm with the vectorized domain name training corpus to produce a trained machine learning model;
   generating, using an electronic processor, at least one output internet domain name by the trained machine learning model; and
   outputting the at least one output internet domain name.

2. The method of claim 1, wherein the outputting comprises causing the at least one output internet domain name to be displayed.

3. The method of claim 1, further comprising:
   presenting the at least one output internet domain name to a potential registrant.

4. The method of claim 1, wherein the generating comprises reverse mapping based on a maximum vector component using the vector space embedding model.

5. The method of claim 1, wherein the generating comprises reverse mapping based on a beam search using the vector space embedding model.

6. The method of claim 1, wherein the adding at least one tag to tokens in the tokenized domain name training corpus comprises adding at least one named entity recognition information tag.

7. The method of claim 1, wherein the adding at least one tag to tokens in the tokenized domain name training corpus comprises adding at least one parts-of-speech information tag.

8. The method of claim 1, wherein the adding at least one tag to tokens in the tokenized domain name training corpus comprises adding at least one sentiment information tag.

9. The method of claim 1, wherein the adding at least one tag to tokens in the tokenized domain name training corpus comprises adding at least one search engine score information tag.

10. The method of claim 1, further comprising:
  selecting, prior to the generating, a set of parameters for the trained machine learning model;
  evaluating, prior to the outputting, the trained machine learning model using the at least one output domain name; and
  repeating the selecting, the generating, and the evaluating at least once prior to the outputting.

11. A computer system for generating internet domain names using machine learning, the computer system comprising at least one electronic processor programmed to perform:
  accessing an embedding training corpus of computer-readable text;
  parsing terms in the embedding training corpus of text to produce a tokenized embedding training corpus of text;
  adding at least one tag to parsed terms in the tokenized embedding training corpus of text to produce a tagged tokenized embedding training corpus of text;
  vectorizing the tagged tokenized embedding training corpus of text to produce a vector space embedding model, which maps tagged tokenized terms to vectors;
  identifying a domain name training corpus of registered internet domain names;
  parsing domain names of the domain name training corpus of registered internet domain names to obtain a tokenized domain name training corpus;
  adding at least one tag to tokens in the tokenized domain name training corpus to obtain a tagged tokenized domain name training corpus;
  vectorizing tagged tokenized terms of the tagged tokenized domain name training corpus using the vector space embedding model to produce a vectorized domain name training corpus;
  training a machine learning algorithm with the vectorized domain name training corpus to produce a trained machine learning model;
  generating at least one output internet domain name by the trained machine learning model; and
  outputting the at least one output internet domain name.

12. The system of claim 11, wherein the at least one electronic processor is further programmed to perform:
  presenting the at least one output internet domain name to a potential registrant.

13. The system of claim 11, wherein the generating comprises reverse mapping based on a maximum vector component using the vector space embedding model.

14. The system of claim 11, wherein the generating comprises reverse mapping based on a beam search using the vector space embedding model.

15. The system of claim 11, wherein the adding at least one tag to tokens in the tokenized domain name training corpus comprises adding at least one named entity recognition information tag.

16. The system of claim 11, wherein the adding at least one tag to tokens in the tokenized domain name training corpus comprises adding at least one parts-of-speech information tag.

17. The system of claim 11, wherein the adding at least one tag to tokens in the tokenized domain name training corpus comprises adding at least one sentiment information tag.

18. The system of claim 11, wherein the adding at least one tag to tokens in the tokenized domain name training corpus comprises adding at least one search engine score information tag.

19. The system of claim 11, wherein the at least one electronic processor is further programmed to perform:
  selecting, prior to the generating, a set of parameters for the trained machine learning model;
  evaluating, prior to the outputting, the trained machine learning model using the at least one output domain name; and
  repeating the selecting, the generating, and the evaluating at least once prior to the outputting.

20. Computer readable non-transitory media comprising computer readable instructions, which, when executed by a computer system comprising at least one electronic processor, cause the computer system to generate internet domain names using machine learning by:
  accessing an embedding training corpus of computer-readable text;
  parsing terms in the embedding training corpus of text to produce a tokenized embedding training corpus of text;
  adding at least one tag to parsed terms in the tokenized embedding training corpus of text to produce a tagged tokenized embedding training corpus of text;
  vectorizing the tagged tokenized embedding training corpus of text to produce a vector space embedding model, which maps tagged tokenized terms to vectors;
  identifying a domain name training corpus of registered internet domain names;
  parsing domain names of the domain name training corpus of registered internet domain names to obtain a tokenized domain name training corpus;
  adding at least one tag to tokens in the tokenized domain name training corpus to obtain a tagged tokenized domain name training corpus;
  vectorizing tagged tokenized terms of the tagged tokenized domain name training corpus using the vector space embedding model to produce a vectorized domain name training corpus;
  training a machine learning algorithm with the vectorized domain name training corpus to produce a trained machine learning model;
  generating at least one output internet domain name by the trained machine learning model; and
  outputting the at least one output internet domain name.

* * * * *